United States Patent [19]
Schaaf et al.

[11] Patent Number: 6,009,802
[45] Date of Patent: Jan. 4, 2000

[54] MOBILE SCRAP CUTTER AND METHOD FOR ASSEMBLING AND DISASSEMBLING THE SAME

[75] Inventors: Michael Schaaf, Soligen; Peter Pöhl; Heinrich Knufmann, both of Rommerskirchen, all of Germany

[73] Assignee: Svedala Lindemann GmbH, Dusseldorf, Germany

[21] Appl. No.: 09/101,901

[22] PCT Filed: Jan. 17, 1997

[86] PCT No.: PCT/DE97/00077

§ 371 Date: Aug. 27, 1998

§ 102(e) Date: Aug. 27, 1998

[87] PCT Pub. No.: WO97/26104

PCT Pub. Date: Jul. 24, 1997

[30] Foreign Application Priority Data

Jan. 19, 1996 [DE] Germany ............................ 196 01 735

[51] Int. Cl.[7] ........................................................ B30B 9/32
[52] U.S. Cl. .................... 100/39; 29/469; 100/94; 100/100; 100/901; 241/101.75
[58] Field of Search ....................... 100/94–98 R, 100/100, 232, 901, 39; 29/401.1, 469; 241/101.71, 101.74, 101.75, 101.76, 101.77, DIG. 38

[56] References Cited

U.S. PATENT DOCUMENTS

| | | |
|---|---|---|
| 3,517,608 | 6/1970 | Tezuka ..................................... 100/100 |
| 3,610,136 | 10/1971 | O'Harah . |
| 3,641,927 | 2/1972 | Ballard .................................... 100/100 |
| 3,730,078 | 5/1973 | Flanagan ................................. 100/100 |
| 3,765,323 | 10/1973 | Hix ........................................ 100/100 |
| 4,136,432 | 1/1979 | Melley, Jr. ................................ 29/469 |
| 4,337,694 | 7/1982 | Brown ........................................ 100/94 |
| 4,467,716 | 8/1984 | Woods et al. ........................... 100/901 |
| 4,491,279 | 1/1985 | Long et al. ......................... 241/101.75 |
| 4,782,748 | 11/1988 | Betsinger . |
| 4,881,459 | 11/1989 | Ramun .................................... 100/100 |
| 4,951,885 | 8/1990 | Thiis ................................. 241/101.75 |
| 5,647,545 | 7/1997 | Conner ............................. 241/101.75 |
| 5,659,940 | 8/1997 | Bielfeldt ................................. 29/401.1 |

FOREIGN PATENT DOCUMENTS 1466946 1/1967 France .

Primary Examiner—Stephen F. Gerrity
Attorney, Agent, or Firm—Darby & Darby

[57] ABSTRACT

A scrap cutter transport unit reduces assembly and dismantling times during production of mass-produced components. The scrap cutter transport unit includes a base frame for accommodating assemblies in both their transportation and operating states. During transportation, the transport unit accommodates a cutter stand in a removed state so that the cutter stand can pivot about a point. A second transport unit is formed by a press frame which includes auxiliary supports for transportation purposes.

13 Claims, 2 Drawing Sheets

6,009,802

MOBILE SCRAP CUTTER AND METHOD FOR ASSEMBLING AND DISASSEMBLING THE SAME

BACKGROUND OF THE INVENTION

1. Field of the Invention

The invention relates to a mobile scrap cutter and to a method for assembling and disassembling the same, so that the scrap cutter can be moved cost-effectively to and used at the respective operating site to cut scrap.

2. Description of the Prior Art

Mobile scrap cutters known in the art are typically divided into two groups: In the first group, a functional unit is permanently mounted, for example, on an automobile, e.g. a truck, and is ready for use and can be operated at any time; in the second group, a folded-up unit is placed on a flatbed transport unit and has to be reassembled at the operating site before the unit fully functional. Conventional scrap cutters in the second group are typically folded up by rotating the cutter stand with respect to the press bed or vice versa.

It is difficult to secure the components of this type of scrap cutter in place during transport and during the operation.

SUMMARY OF THE INVENTION

It is the object of the invention to provide a mobile scrap cutter which overcomes the above problem and can be easily transported. The scrap cutter of the invention has at least two preassembled transport units which include the following components: a base frame with spring elements and support members, a cutter stand with a cutter bar carriage, a press bed with a slider cylinder and a slider, a hydraulic drive unit with accessories, such as hydraulic lines and an oil cooler, and a control box. It is another object of the invention to provide a method for assembling and disassembling the scrap cutter within a short time and to employ mass-produced components adapted for use in conventional permanently installed scrap cutters.

The object is solved in that one of the transport units forms the base frame and holds the components during transport as well as during the operation. During transport, the cutter stand is laid down by pivoting the cutter stand about a pivot point. The other transport unit is formed by the press bed which has auxiliary support members for transport. Additional embodiments of the invention include having the slider cylinder together with the slider plate laid down on the first transport unit. The hydraulic drive unit, the oil cooler, the hydraulic lines and the control box may be permanently mounted on the base frame. The cutter stand may further comprise the spring element; a swivel bearing; and a support bolt which is used during transport. The spring elements may be secured during transport by clamping means. The base frame may comprise support members, permanently mounted to the base frame, for supporting the press bed. The support members may be split to be spaced apart and arranged on the press bed. The support members may be provided with insertion guides for mounting the press bed. The spring elements may be fixed in place during transport through the support members. The cutter stand may form a separate transport unit. The press bed may be completely preassembled without a lateral pressure cylinder. Support cables may be included which are matched to the load distribution.

The mobile scrap cutter can be assembled within a short time by using the assembly method for assembling a mobile scrap cutter comprising the steps of: lifting a base frame including a superstructure from transport means; placing the base frame on a prepared ground location; raising a cutter stand by pivoting the cutter stand about a pivot point via a swivel bearing; placing the cutter stand on spring elements; pulling out a support bolt; releasing clamping means of the spring elements; lifting and removing a slider cylinder and a slider plate from the base frame; lifting a press bed from transport means; placing the press bed onto support members which are split and spaced apart; connecting the split support members to each other; releasing the clamping means of the spring elements of the press bed which were secured for transport; connecting the press bed to the cutter stand; installing the cutter and a stamping rail; lifting the slider cylinder including the slider plate to a position relative to the press bed and to a rear support member; installing a lateral pressure cylinder; providing hydraulic and electrical connections; and filling the hydraulic connections with hydraulic oil. The scrap cutter can be disassembled by reversing the order of the assembly steps when the scrap cutter is to be transported to another operating site.

The advantages of the scrap cutter of the invention can be summarized as follows:

An investment decision about an efficient mass-produced scrap cutter can be made quickly and planning can commence before a decision about the operating site is made; no costly machine foundations are required;

Short assembly and start-up times;

Convenient transfer of the scrap cutter to another site;

Retaining the advantages of a stationary scrap cutter.

BRIEF DESCRIPTION OF THE DRAWINGS

The drawings show in:

FIG. 2b a front view of the scrap cutter of FIG. 2a.

DESCRIPTION OF THE PREFERRED EMBODIMENTS

Figure 1A:
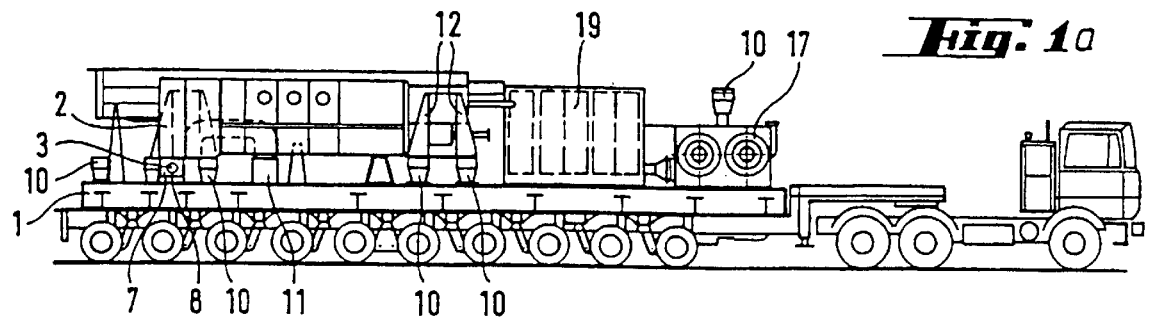
FIG. 1a a side view of the transport unit with the base frame and the transport means.

The ready-to-operate scrap cutter has a cutter stand 2 which is mounted on a base frame 1 with the help of spring elements 10 and further includes a slider cylinder 5 and a slider plate 6, a press bed 4 with a lateral pressure cylinder 13, a hydraulic drive unit 16 with an oil cooler 17 and hydraulic lines 18 and a control box.

Figure 1B:
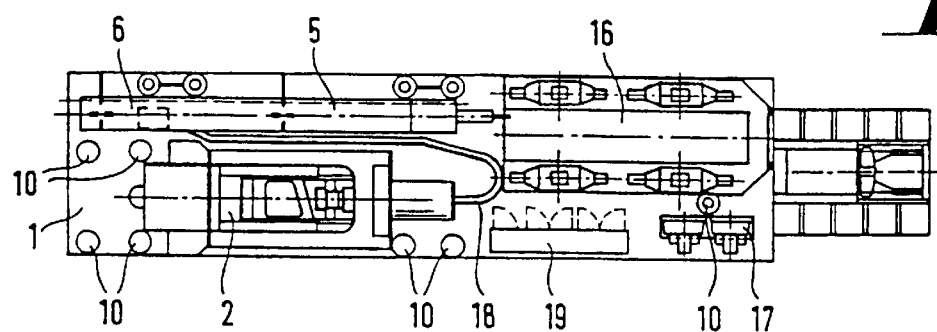
FIG. 1b a top view of the transport unit of FIG. 1a without the transport means.

Referring now to FIGS. 1a, 1b, the arrangement of the scrap cutter of the invention forms a first transport unit which includes the base frame 1 and the spring elements 10 and support members 12 adapted to receive the following components: the cutter stand 2 with the cutter bar carriage (not shown), the slider cylinder 5 and the slider plate 6 both in the transport position and in the operating position and the following permanently mounted components: the hydraulic drive unit 16 with the hydraulic lines 18, the oil cooler 17 and the control box 19. During transport, the cutter stand 2 is lowered on the base frame 1 by pivoting the cutter stand 2 about a pivot point 3 via a swivel bearing 7 which is located on the cutter stand 2 together with the spring elements 10 and a support bolt 8. The slider cylinder 5 and the slider plate 6 are also set down on the base frame 1.

The spring elements 10 which support the cutter stand 2 and the press bed 4 on the base frame 1 in the operating position (FIG. 2), are secured during transport by clamping means (not shown).

Figure 1C:
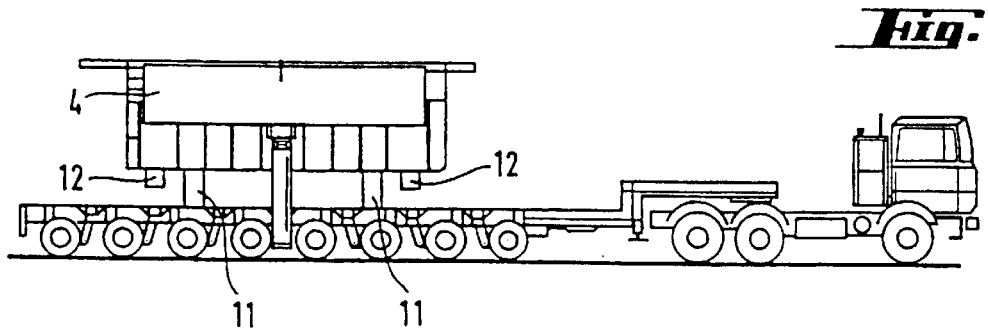
FIG. 1c a side view of the transport unit with the press bed and the transport means.
Figure 1D:
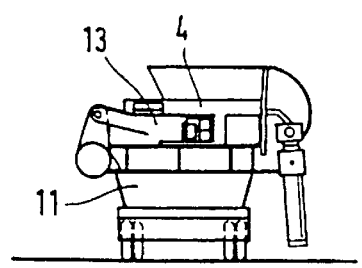
FIG. 1d a front view of the transport unit of FIG. 1c without the transport means.
Figure 2A:
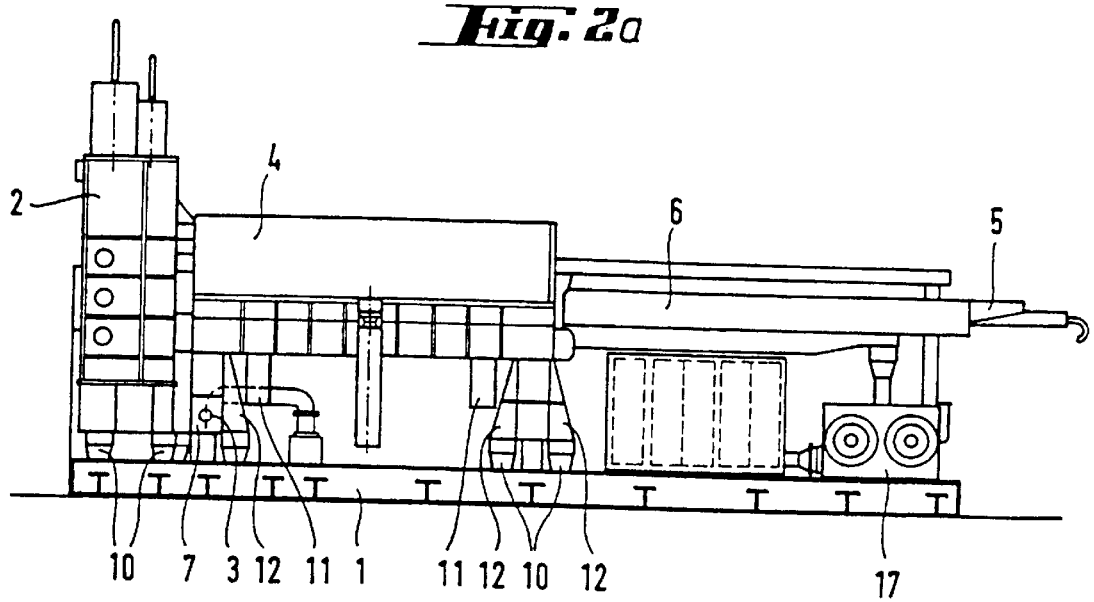
FIG. 2a a side view of the scrap cutter in the operating position.
Figure 2B:
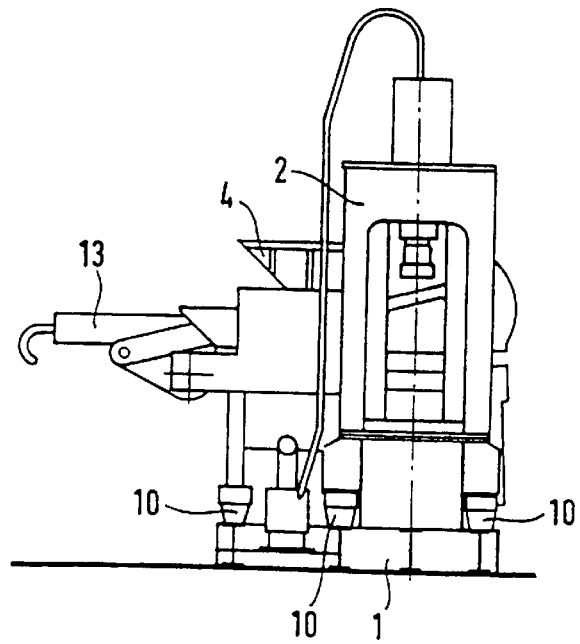

The base frame 1 has permanently mounted support members 12 for supporting the press bed 4 which are split and in part arranged on the press bed 4 (FIGS. 1c, 2a).

According to FIG. 1c, the second transport unit is formed by the press bed 4 (which is provided with a protective cover) which is provided with auxiliary support members 11 for transport and which is completely preassembled except for the lateral pressure cylinder 13.

The arrangement described above and consisting of the two units is advantageously transported on a semitrailer truck (e.g. a trailer combination with preferably 8 to 10 axles). In special situations, it can be advantageous to include in the first transport unit only the base frame 1 and the cutter stand 2 which is lowered by pivoting about the pivot point 3, and those components which are permanently installed on the base frame 1, e.g. the hydraulic drive unit 16 (which is also provided with a protective cover) with accessories, including the oil cooler 17 and the hydraulic lines 18, and to transport the slider cylinder 5 with the slider plate 6 separately. The cutter stand 2 can also be transported separately.

Support cables (not shown) ensure that the load is distributed evenly during transport.

The permanently installed hydraulic lines 18 of which not all are shown, have adapter means for draining, sealing and/or connecting the lines.

The arrangement of the invention simplifies assembly and enables unexpectedly short assembly times of at most two days, if the following inventive steps are followed: The base frame 1 including the superstructure is lifted from the transport means and set down on the prepared ground which advantageously does not have to be a conventional foundation;

The cutter stand 2 is raised by pivoting the cutter stand 2 about the pivot point 3 via the swivel bearing 7 so as to rest on the spring elements 10 which are still secured with the clamping means;

The support bolt is pulled out;

The clamping means for the spring elements 10 of the cutter stand 2 which were secured for transport, are released;

The slider cylinder 5 and the slider plate 6 are lifted and removed from the base frame 1;

The press bed 4 is lifted from the transport means and set down on the support member 12, and the split support members 12 which have insertion guides for positioning, are connected to each other;

The clamping means of the spring elements 10 of the press bed 4 which were secured for transport, are released;

The press bed 4 is connected to the cutter stand 2;

The cutter and the stamping rail are installed,

The slider cylinder 5 including the slider plate 6 are raised into the proper position relative to the press bed 4 and the rear support member 12;

The lateral pressure cylinder 13 is installed;

The hydraulic and electrical lines are connected, wherein this assembly step is facilitated in that the limit switch is already installed on the slider plate 6, the control box 19 with the electrical components has non-interchangeable connectors, and the hydraulic lines 18 also include the adapter means for draining and sealing;

The hydraulic oil which is supplied by an tanker truck accompanying the transport unit, is filled, wherein the hydraulic section is located above a collection pan (not shown) adapted to collect any leaking fluid.

List of reference numerals
1=base frame
2=cutter stand
3=pivot point
4=press bed
5=slider cylinder
6=slider plate
7=swivel bearing
8=support bolt
10=spring element
11=auxiliary supports
12=support members
13=lateral pressure cylinder
16=hydraulic drive unit
17=oil cooler
18=hydraulic lines
19=control box

What is claimed is:

1. A mobile scrap cutter comprising:
    a first preassembled transport unit having:
        a base frame with spring elements and support members for receiving a cutter stand with a cutter bar carriage and for receiving a slider cylinder and a slider; and
        a hydraulic drive unit including hydraulic lines, an oil cooler, and a control box; and
    a second preassembled transport unit having:
        a press bed and
        auxiliary support members;
    the spring elements being designed to support the press bed upon assembly of the first and second transport unit;
    wherein the first transport unit has the base frame thereof receive components during transport and during operation; and
    wherein, during transport, the cutter stand of the first transport unit is pivoted about a pivot point to be oriented in a laid down position.

2. The mobile scrap cutter of claim 1, wherein the slider cylinder together with a slider plate is laid down on the first transport unit.

3. The mobile scrap cutter of claim 1, wherein the hydraulic drive unit, the oil cooler, the hydraulic lines and the control box are permanently mounted on the base frame.

4. The mobile scrap cutter of claim 1, wherein the cutter stand further comprises:
    a swivel bearing; and
    a support bolt which is used during transport.

5. The mobile scrap cutter of claim 1, wherein the spring elements are secured during transport by clamping means.

6. The mobile scrap cutter of claim 1, wherein the base frame comprises:
    support members, permanently mounted to the base frame, for supporting the press bed.

7. The mobile scrap cutter of claim 6, wherein the support members are split to be spaced apart and are arranged such as to support the press bed.

8. The mobile scrap cutter of claim 7, wherein the support members are provided with insertion guides for mounting the press bed.

9. The mobile scrap cutter of claim 1, wherein the spring elements are fixed in place during transport through the support members.

10. The mobile scrap cutter of claim 9, wherein the hydraulic lines comprise means for draining and sealing hydraulic fluid.

11. The mobile scrap cutter of claim 1, wherein the cutter stand forms a separate transport unit.

12. The mobile scrap cutter of claim 1, wherein the press bed is completely preassembled without a lateral pressure cylinder.

13. A method for assembling a mobile scrap cutter comprising the steps of:

lifting a base frame including a superstructure from transport means;

placing the base frame on a prepared ground location;

raising a cutter stand by pivoting the cutter stand about a pivot point via a swivel bearing;

placing the cutter stand on spring elements;

pulling out a support bolt;

releasing clamping means of the spring elements;

lifting and removing a slider cylinder and a slider plate from the base frame;

lifting a press bed from transport means;

placing the press bed onto support members which are split and spaced apart;

connecting the split support members to each other;

releasing the clamping means of the spring elements of the press bed which were secured for transport;

connecting the press bed to the cutter stand;

installing the cutter and a stamping rail;

lifting the slider cylinder including the slider plate to a position relative to the press bed and to a rear support member;

installing a lateral pressure cylinder;

providing hydraulic and electrical connections; and filling the hydraulic connections with hydraulic oil.

\* \* \* \* \*